No. 750,392. PATENTED JAN. 26, 1904.
C. H. PIXLEY.
EYEGLASSES.
APPLICATION FILED MAY 28, 1900. RENEWED JUNE 1, 1903.
NO MODEL.

Witnesses:
Frank S. Blanchard
Harold S. Barrett.

Inventor:
Charles H. Pixley
By Snider & Hopkins
Attorneys.

No. 750,392. Patented January 26, 1904.

UNITED STATES PATENT OFFICE.

CHARLES H. PIXLEY, OF CHICAGO, ILLINOIS.

EYEGLASSES.

SPECIFICATION forming part of Letters Patent No. 750,392, dated January 26, 1904.

Application filed May 28, 1900. Renewed June 1, 1903. Serial No. 159,518. (No model.)

*To all whom it may concern:*

Be it known that I, CHARLES H. PIXLEY, a citizen of the United States, residing at Chicago, in the county of Cook, and State of Illinois, have invented certain new and useful Improvements in Eyeglasses, of which the following is a specification.

The present invention relates more especially to that class of eyeglasses in which the lenses (or the lens-frames) are connected by a saddle-bridge, such as is customarily used for spectacles, so shaped that it is adapted to rest upon the bridge of the nose, and thus form the principal support for the glasses, guards being provided for gripping the nose and preventing the glasses from falling off.

The object of the invention is primarily to improve the construction of eyeglasses of this class; but in accomplishing this object I have devised a guard of improved construction which is not limited in its use to eyeglasses of this class.

The invention consists in the features of novelty that are hereinafter described, with reference to the accompanying drawings, which are made a part of this specification, and in which—

Figure 1:
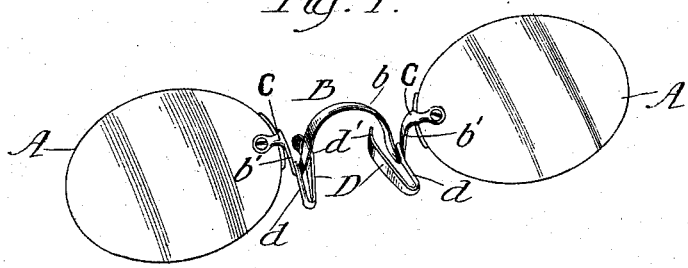
Figure 2:
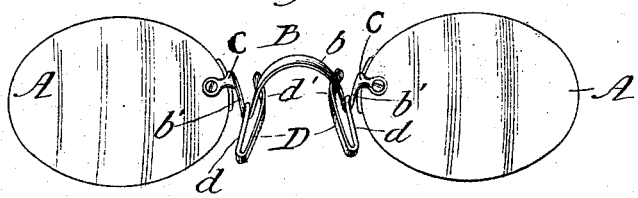
Figure 3:
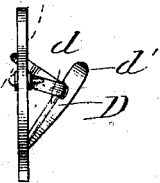
Figure 4:

Figure 1 is a perspective view of a pair of eyeglasses embodying the invention. Fig. 2 is a front elevation thereof. Fig. 3 is a side elevation thereof. Fig. 4 is an enlarged perspective view of one of the improved guards.

A A are the lenses, and B a saddle-bridge of the class commonly used for spectacles. It comprises an intermediate curved portion or bridge proper, $b$, which is intended to conform to and seat upon the bridge of the nose, and a pair of shanks $b'$, one at each end of the bridge, the shanks being united either to the lens-frames, where frames are used, or to the fittings C, to which the lenses are secured in customary manner. It is the intention that the bridge $b$ shall occupy a position approximately at right angles to the top line of that portion of the bridge of the nose on which it seats, and it is the intention that the shanks $b'$ shall be of such length and bear such relation to the bridge that they will support the lenses in a vertical plane and at the proper height and distance from the eyes. To this end the length of the shanks may vary in order to get the forward and back adjustment of the lenses, and they may be bent at their junctions with the bridge and elsewhere, if necessary, to secure the other adjustments. This entire saddle-bridge is made of metal which is sufficiently ductile to enable its several parts to be bent in order to adjust it as above described and at the same time of such elasticity that the parts will retain their shape under normal conditions and give the bridge more or less spring for the purpose of pressing the guards D against the sides of the nose. Each of the guards preferably consists of an individual stem $d$, that is secured to the saddle-bridge, and a pad $d'$, that is adapted to engage the nose, the two parts $d$ and $d'$ being made of a single piece of metal reflexed or doubled upon itself, so that said parts lie side by side, (approximately parallel.) The stem $d$ is preferably round in cross-section in order that it may be bent laterally in any direction, while the pad $d'$ is preferably in the form of a broad thin plate which may be bent or twisted, so as to make it conform accurately to the part of the nose with which it is intended to have contact, the pad and the stem being also adjustable relatively to each other. Preferably the stems of the guards are directly and permanently attached to the saddle-bridge by means of solder. They should be attached at the points that will best meet the requirements of individual cases; but ordinarily when made in large quantities for stock they will be attached directly in the crotches between the bridge $b$ and the shanks $b'$ and with the pads between the stems and also between the extremities of the bridge. With this arrangement the pads may be adjusted in an up and down direction, so as to engage the sides of the nose at any desired height, and in addition they may be placed at any desired angle with respect to the bridge of the nose by simply bending their stems, as may be necessary. The adjustability of the guards as a whole is so great that when attached at these points it will be necessary to keep in stock only a comparatively few sizes, differing principally in the length of the bridge and the length of the shanks $b'$.

The guards, like the saddle-bridge, are made of metal, which is sufficiently ductile to admit of the adjustments above described and at the same time sufficiently elastic to retain their shape and have a considerable springing action, especially in the pads $d'$ and at the junctions of the pads with the stems $d$. Each guard is made of a single piece of wire, a portion of which is left of round cross-section to form the stem $d$, while the remainder is flattened to form the pad $d'$, the result of the flattening being that the pad is very much more elastic than the stem $d$. As shown in Fig. 3 of the drawings, the pads occupy a position approximately at right angles to the plane of the bridge; but it will be understood that they may be placed at any desired angle with respect to the bridge by bending the stems $d$ or by bending the pads or by bending both the stems and the pads. In fact, this reflexed form of guard makes possible a range of adjustments which is not possible with any guard of which I am aware.

Having described my invention, what I claim as new, and desire to secure by Letters Patent, is—

1. As a new article of manufacture, an eyeglass having, in combination, lenses, a saddle-bridge having a curved portion adapted to conform to and rest directly upon the nose, and guards having stems secured directly to the saddle-bridge at points between its points of attachment to the lenses and its surface of contact with the nose, said guards being adjustable independently of said curved portion of the saddle-bridge, substantially as described.

2. As a new article of manufacture, an eyeglass having in combination, lenses, a saddle-bridge adapted to conform to and rest directly upon the nose, and guards secured directly to the saddle-bridge at points intermediate of its points of attachment to the lenses, the guards being made of material sufficiently ductile to permit them to be bent and thereby adjusted to the proper shape and at the same time sufficiently elastic to retain their shape under ordinary usage, substantially as and for the purpose described.

3. As a new article of manufacture, an eyeglass having, in combination, lenses, a saddle-bridge adapted to conform to and rest directly upon the nose, and guards each formed of a single piece of metal reflexed or doubled upon itself to provide a stem and a pad lying side by side, the stems of the guards being secured directly to the saddle-bridge at points intermediate of its points of attachment to the lenses, substantially as described.

4. As a new article of manufacture, an eyeglass having, in combination, lenses, a saddle-bridge comprising a bridge proper adapted to conform to and rest upon the bridge of the nose, and reflexed shanks, and guards having stems secured to the saddle-bridge in the crotches between the bridge proper and the shanks thereof, substantially as described.

5. As a new article of manufacture, an eyeglass having, in combination, lenses, a saddle-bridge comprising a bridge proper adapted to conform to and rest upon the bridge of the nose, and reflexed shanks, and guards, each having a stem and a pad lying side by side, the stems being secured directly to the saddle-bridge at points intermediate of its points of attachment to the lenses and occupying positions approximately at right angles to the plane of the bridge, substantially as described.

6. As a new article of manufacture, an eyeglass having, in combination, lenses, a saddle-bridge comprising a bridge proper adapted to conform to and rest upon the bridge of the nose, and reflexed shanks, and guards, each of the guards comprising a stem disposed in a position approximately at right angles to the plane of the saddle-bridge and secured directly thereto at points intermediate of its points of attachment to the lenses, and a pad joined at one end to one end of the stem and disposed approximately parallel therewith, the stem and pad being made of metal sufficiently ductile to permit them to be bent and thereby adjusted to the desired position and at the same time sufficiently elastic to retain their shape under ordinary usage, substantially as described.

7. As a new article of manufacture, an eyeglass having, in combination, lenses, a saddle-bridge having a curved portion adapted to conform to and rest directly upon the nose, and guards having stems secured directly to the saddle-bridge at points between its points of attachment to the lenses and the extremities of said curved portion, said guards having also pads lying between the extremities of said curved portion and adjustable independently of said curved portion, substantially as described.

8. As a new article of manufacture, an eyeglass having, in combination, lenses, a saddle-bridge adapted to conform to and rest directly upon the nose, and guards each formed of a single piece of metal reflexed or doubled upon itself to provide a stem and a pad lying side by side, the stems of the guards being secured directly to the saddle-bridge at points intermediate of its points of attachment to the lenses, and the pads being between the stems, substantially as set forth.

9. As a new article of manufacture, an eyeglass having lenses, a saddle-bridge comprising a bridge proper adapted to conform to and rest upon the bridge of the nose, and reflexed shanks joining the ends of the bridge, the lenses being secured to said shanks, and guards each having a stem and a pad lying side by side and formed of a single piece of metal doubled upon itself, the stems of the pads being secured directly to the saddle-bridge in the crotches between the bridge proper and the shanks, and the pads being disposed transversely to the general plane of the bridge, substantially as described.

CHARLES H. PIXLEY.

Witnesses:
L. M. HOPKINS,
N C. GRIDLEY.